(12) United States Patent
Choi et al.

(10) Patent No.: US 8,744,757 B2
(45) Date of Patent: Jun. 3, 2014

(54) REAL-TIME MAP DATA UPDATING SYSTEM AND METHOD

(75) Inventors: Yun Seok Choi, Seoul (KR); Eun Bok Lee, Seoul (KR)

(73) Assignee: SK Planet Co., Ltd, Seoul (KR)

( * ) Notice: Subject to any disclaimer, the term of this patent is extended or adjusted under 35 U.S.C. 154(b) by 0 days.

(21) Appl. No.: 13/820,042

(22) PCT Filed: Apr. 17, 2012

(86) PCT No.: PCT/KR2012/002893
§ 371 (c)(1),
(2), (4) Date: Mar. 21, 2013

(87) PCT Pub. No.: WO2012/157850
PCT Pub. Date: Nov. 22, 2012

(65) Prior Publication Data
US 2014/0058661 A1    Feb. 27, 2014

(30) Foreign Application Priority Data

May 19, 2011  (KR) .................. 10-2011-0047487
May 19, 2011  (KR) .................. 10-2011-0047488

(51) Int. Cl.
*G06C 21/00* (2006.01)

(52) U.S. Cl.
USPC ......................................... 701/428; 707/609

(58) Field of Classification Search
CPC ............................. G01C 21/34; G01C 21/00
USPC ......... 701/428, 533, 412, 409, 408, 414, 415, 701/410, 423; 340/995.1, 995.13
See application file for complete search history.

(56) References Cited

U.S. PATENT DOCUMENTS

| | | | | |
|---|---|---|---|---|
| 7,710,421 | B2 * | 5/2010 | Muramatsu | 345/440 |
| 7,835,858 | B2 * | 11/2010 | Smyth et al. | 701/439 |
| 2005/0114019 | A1 * | 5/2005 | Umezu et al. | 701/210 |
| 2009/0177390 | A1 * | 7/2009 | Mikusiak | 701/210 |

FOREIGN PATENT DOCUMENTS

| | | |
|---|---|---|
| JP | 2006527838 | 12/2006 |
| KR | 1020090041065 | 4/2009 |
| KR | 100902934 | 6/2009 |
| KR | 1020090062161 | 6/2009 |
| KR | 1020110008767 | 1/2011 |

OTHER PUBLICATIONS

International Search Report mailed Nov. 28, 2012 for PCT/KR2012/002893.

\* cited by examiner

*Primary Examiner* — Marthe Marc-Coleman
(74) *Attorney, Agent, or Firm* — Lowe Hauptman & Ham, LLP

(57) ABSTRACT

In a system and method for updating a real-time map, operating environment information of a terminal device, which is basic information for update condition determination, is collected, an update condition of a terminal device, which includes one or more of a state of travel, a travel speed, and a network state, is checked by comparing the collected operating environment information with preset criteria, and map data, which is stored in the terminal device, in a combination of one or more of level, tile, and layer units corresponding to the checked update condition, is partially updated.

26 Claims, 10 Drawing Sheets

REAL-TIME MAP DATA UPDATING SYSTEM AND METHOD

CROSS-REFERENCE TO RELATED APPLICATION

The present application is a national stage entry of International Patent Application No. PCT/KR2012/002893, filed Apr. 17, 2012, which claims priority to Korean Patent Application No. 10-2011-0047487, filed on May 19, 2011 and Korean Patent Application No. 10-2011-0047488, filed on May 19, 2011.

BACKGROUND

1. Field of the Invention

The present invention relates generally to a system and method for a real-time update of map data stored in a terminal device and, more particularly, to a system and method for performing a real-time update of map data in a combination of one or more of level, tile and layer units according to update conditions.

2. Related Art

A car navigation system devised to use in vehicles offers a function to guide a current position based on a map or to guide a route to a desired destination. With communication technologies advanced in these days, a function to guide an optimum route based on real-time traffic information to users is also offered.

This car navigation system may be classified into a map-stored navigation system and a map-streaming navigation system. In the former, a terminal device stores map data therein and, based on the stored map data, detects its current position and performs route guidance. In the latter, the terminal device operates by receiving real-time map data from a server through a network.

The map-stored navigation system has a fast operating speed because of using stored map data, but requires a frequent update of the stored map data because of inevitable changes in map data due to passage of time. Unfortunately, no update of map data may make it difficult to perform exact route guidance due to unapplied geographic information.

The map-streaming navigation system can always offer the newest map data to users because it receives map data of local area from a server via a network throughout its operations. However, this system requires much time for receiving and displaying map data and, if no transmission of map data results from data communication environment or surrounding environment, fails to offer a route guidance service to users.

Accordingly, the present invention is to solve the above conventional problems and, more particularly, to provide a real-time map data updating system and method that can always offer a service based on the newest map data and minimize user's waiting time by combining a map-stored system and a map-streaming system.

Also, the present invention is to provide a real-time map data updating system and method that perform a real-time update for map data in a combination of one or more of level, tile and layer units according to update conditions including a terminal device state and a network state.

And also, the present invention is to provide a real-time map data updating system and method that perform a real-time update for map data in units of layer data that shows information corresponding to respective attributes when this information expressing a map is classified according to attribute.

BRIEF SUMMARY

One aspect of the present invention provides a real-time map data updating system that comprises a service device configured to store map data including one or more of physical level data which expresses a specific area on one or more scales, one or more of tile data which indicates given-sized division of the specific area, and one or more of layer data which shows classified information on a map, and to provide the map data in one or more units of level, layer and tile units at an update request of a terminal device; and the terminal device configured to perform a route guidance function based on the stored map data, to determine parts for update in the stored map data in level, layer and tile units according to update conditions, to receive map data of the determined parts by sending a request to the service device, and to apply the received map data to the stored map data.

In the real-time map data updating system of this invention, the service device is further configured to classify pieces of information expressing the map data according to attributes, to construct map data using a plurality of pieces of layer data each of which shows information corresponding to and classified by each attribute, and to manage an update version of the map data by the respective layer data.

Another aspect of the present invention provides a service device that comprises a memory unit configured to store map data including one or more of physical level data which expresses a specific area on one or more scales, one or more of tile data which indicates given-sized division of the specific area, and one or more of layer data which shows classified information on a map; a map data management unit configured to manage versions of the map data, and to determine parts for update in the map data in a combination of one or more of level, layer and tile units according to update conditions of a terminal device; and a map data transmission unit configured to retrieve, from the memory unit, map data of the parts for update determined by the map data management unit, and to transmit the retrieved map data to the terminal device.

In the service device of this invention, the update conditions includes one or more of a travel state of the terminal device, a travel speed of the terminal device, and a network state.

The service device of this invention may further comprise one or more of an authentication unit configured to authenticate a service use right for a user of the terminal device, and a route service unit configured to extract route information from an origination to a destination in response to a request for the route information from the terminal device, and to provide the extracted route information to the terminal device.

In the service device of this invention, the map data management unit may be further configured to collect in real time operating environment information from the terminal device, and to determine the update conditions on the basis of the collected operating environment information.

In the service device of this invention, the map data management unit may be further configured to classify pieces of information expressing a map according to attributes, to store map data, in the memory unit, formed of a plurality of pieces of layer data each of which shows information corresponding to and classified by each attribute, and to determine layer data to be updated in map data of the terminal device according to an operating state of the terminal device.

In the service device of this invention, the map data management unit may be further configured to, when the terminal device performs route guidance toward a specific destination, determine layer data of attribute associated with a route display toward the destination as the layer data to be updated, and when the terminal device approaches the destination within a given distance, to determine layer data of attribute associated with a position display of the destination as the layer data to be updated.

In the service device of this invention, the layer data of attribute associated with a route display toward the destination may be layer data that shows one or more of a road, a subway line, and a bus line, and also the layer data of attribute associated with a position display of the destination may be layer data that shows buildings including a station, a terminal, a general house, a school, a public office, a hotel, and an apartment.

Still another aspect of the present invention provides a terminal device that comprises a communication unit configured to transmit and receive data through a network; a memory unit configured to store map data including one or more of physical level data which expresses a specific area on one or more scales, one or more of tile data which indicates given-sized division of the specific area, and one or more of layer data which shows classified information on a map; a control unit configured to perform a route guidance function based on the map data, to determine update parts in the map data in a combination of one or more of level, tile and layer units according to update conditions, to receive map data of the determined parts from a service device, and to apply the received map data to the stored map data; and a display unit configured to display a route based on the map data under the control of the control unit.

In the terminal device of this invention, the control unit may include an update management module configured to check the update conditions by collecting in real time operating environment information, and to determine the update parts in the map data in the combination of one or more of level, tile and layer units according to the update conditions; and a map data update module configured to receive, by sending a request to the service device, map data of the update parts corresponding to the combination of one or more of level, tile and layer units determined by the update management module, and to apply the received map data to the stored map data.

In the terminal device of this invention, the memory unit may be further configured to store an update table that defines update parts expressed as combinations of one or more of level, tile and layer units according to predetermined update conditions, and the control unit may be further configured to determine the update parts by referring to the update table.

The terminal device of this invention may further comprise a GPS unit configured to detect and offer one or more of a position, moving direction and speed of the terminal device to be used for the route guidance and update parts determination.

Additionally, the update conditions may include one or more of a travel state of the terminal device, a travel speed of the terminal device, and a network state.

In the terminal device of this invention, when information expressing a map is classified according to attributes, one or more of the layer data may show information corresponding to and classified by each attribute. In this case, the control unit may include an update management module configured to check in real time an operating state of the terminal device, and to determine layer data showing information of attribute required for the terminal device as layer data to be updated; and a map data update module configured to receive, by sending a request to the service device, the layer data determined by the update management module, and to apply the received map data to the stored map data.

In the terminal device of this invention, the update management module may be further configured to, before route guidance toward a destination is started, determine layer data of attribute associated with a route display toward the destination as the layer data to be updated, and when the terminal device approaches the destination within a given distance during the route guidance, to determine layer data of attribute associated with a position display of the destination as the layer data to be updated.

Yet another aspect of the present invention provides a real-time map data updating method that comprises steps of collecting operating environment information of a terminal device as basic information for update condition determination; checking update conditions of the terminal device by comparing the collected operating environment information with predetermined criteria, the update conditions including one or more of a travel state, a travel speed, and a network state; in response to the checked update conditions, selecting update parts of map data in a combination of one or more of level, tile and layer units; and updating map date of the selected update parts.

Further another aspect of the present invention provides a real-time map data updating method in a layer data unit, which comprises steps of, by a service device, after classifying information expressing a map according to attributes, storing map data formed of a plurality of pieces of layer data each of which shows information corresponding to and classified by each attribute; checking an operating state of a terminal device storing map data; if route guidance toward a destination is not started as the result of the checking, transmitting layer data of attribute associated with a route display toward the destination to the terminal device; and if the terminal device approaches the destination within a given distance during the route guidance as the result of the checking, transmitting layer data of attribute associated with a position display of the destination to the terminal device.

Further another aspect of the present invention provides a real-time map data updating method in a layer data unit, which comprises steps of, by a terminal device, after classifying information expressing a map according to attributes, storing map data formed of a plurality of pieces of layer data each of which shows information corresponding to and classified by each attribute; when there is a request for route guidance, updating layer data of attribute associated with a route display toward a destination in the map data; performing the route guidance toward the destination, based on the map data having the updated layer data of attribute associated with a route display toward the destination; checking whether approaching the destination within a given distance during the route guidance; if approaching the destination within a given distance, updating layer data of attribute associated with a position display of the destination in the map data; and performing the route guidance toward the destination, based on the map data having the updated layer data of attribute associated with a position display of the destination.

Also, the present invention provides a computer-readable medium that records thereon a program executing the aforesaid real-time map data updating method.

According to the present invention, when a terminal device stores map data and performs route guidance based on the stored map data, the stored map data is partially updated in real time in a combination of one or more of physical level, tile and layer units according to update conditions of the terminal device. It is therefore possible to offer route guidance based on the newest geographic information with user's waiting time minimized.

Also, in update of map data, this invention allows an effective update with minimized user inconvenience by updating in real time just the minimum information required for operation and transmissible based on a travel state and speed of the terminal device and a network state.

And also, in update of map data, this invention allows an effective update with minimized user inconvenience by updating in real time just the minimum information required for exact route guidance based on an operating state of the terminal device.

As a result, this invention can remarkably enhance user convenience by taking advantages of both a map-stored system and a map-streaming system.

DETAILED DESCRIPTION

Figure 1:
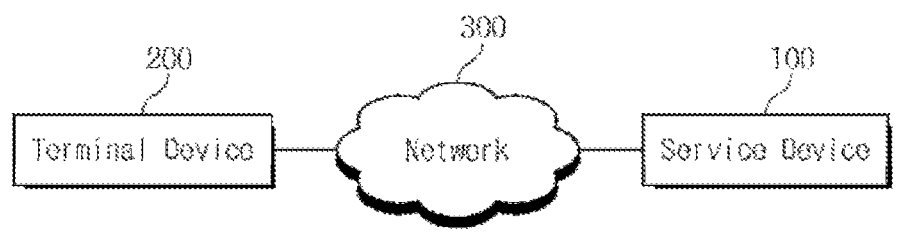
FIG. 1 is a block diagram illustrating a real-time map data updating system in accordance with an embodiment of the present invention.

Hereinafter, a preferred embodiment of the present invention will be described in detail with reference to the accompanying drawings. However, to avoid obscuring the subject matter of the present invention, well known functions or configurations will be omitted from the following descriptions and drawings. Further, the same elements will be designated by the same reference numerals although they are shown in different drawings.

FIG. 1 is a block diagram illustrating a real-time map data updating system in accordance with an embodiment of the present invention.

Referring to FIG. 1, the real-time map data updating system is realized using a service device 100 and a terminal device 200 which transmit and receive data through a network 300.

In one embodiment of this invention, the service device 100 stores map data showing geographic information and provides the map data in at least one unit of tile, level and layer at the request of the terminal device 200. The terminal device 200 checks update conditions according to its operating state and a network state and, depending on the update conditions, sends an update request for partial data of map data in units of tile, level and layer. Then the terminal device 200 receives parts of map data from the service device 100 and performs a real-time update by applying the received map data parts to the stored map data. Also, the terminal device 200 provides a route guidance service based on the real-time update map data.

In another embodiment of this invention, the service device 100 stores map data showing geographic information and checks real-time update conditions according to an operating state of the terminal device 200 and a network state. Then, depending on the update conditions, the service device 100 sends partial data of map data corresponding to one of tile, level and layer units to the terminal device 200 and issues update instructions. The terminal device 200 stores any version of map data and performs a route guidance service based on the stored map data. Once receiving partial data of map data corresponding to one of tile, level and layer units from the service device 100, the terminal device 200 performs a real-time update of the stored map data.

Update conditions may include at least one of a travel state (standby, start of driving, during driving, end of driving, etc.) of the terminal device 200, a travel speed (high speed, low speed, etc.), and a network state (poor, good, etc.).

In other words, this invention allows the service device 100 or the terminal device 200 to check various update conditions as discussed above and to partially update map data on the basis of the checked update conditions such that a route guidance based on the newest map information can be possible with user's waiting time minimized.

For better understanding of a real-time map data update in this invention, map data applied to this invention will be now described with reference to FIGS. 2 and 3.

Figure 2:
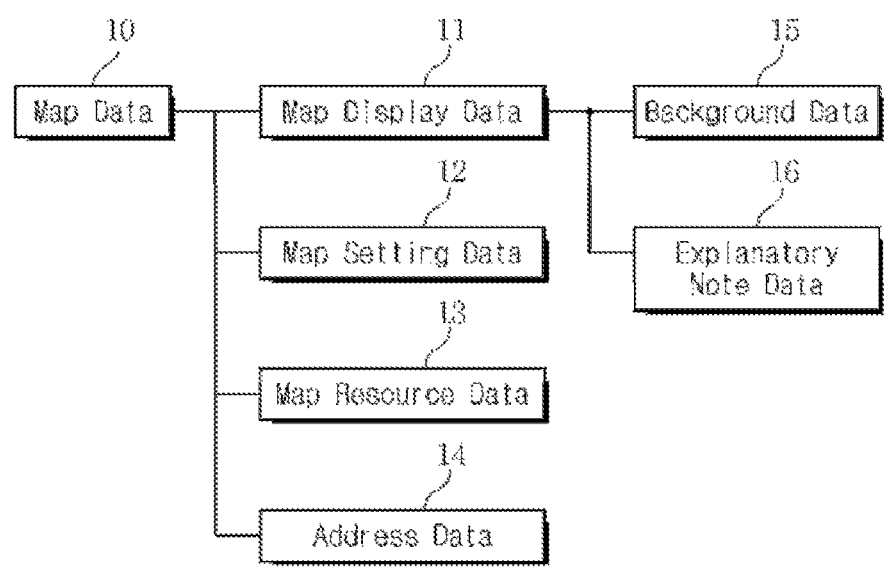
FIG. 2 is a block diagram schematically illustrating a structure of map data used in a real-time map data updating system in accordance with one embodiment of the present invention.

Referring to FIG. 2, the map data 10 which is used for the real-time map data updating system of this invention is composed of map display data 11 used to form an actual map, map setting data 12 associated with a map setting for map colors or levels or the like, map resource data 13 such as landmark images or font resources displayed together on the map, and address data 14 recording address information corresponding to respective coordinates of the map. Among them, the map display data 11 is information used to realize actual map images and includes background data 15 and explanatory note data 16 representing text displayed on the map. The explanatory note data 16 is text data expressed together with geographic information of the map and, for example, indicates names of respective facilities or areas.

Figure 3:
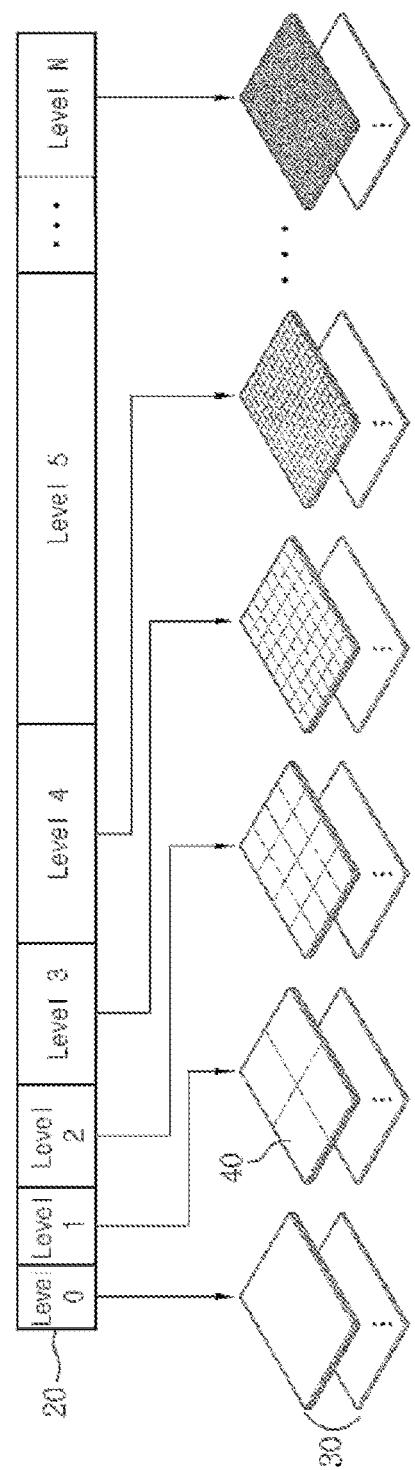
FIG. 3 is a schematic diagram illustrating a structure of map data in accordance with one embodiment of the present invention.

The map data 10, especially the map display data 11, includes L (L is a natural number) pieces of physical level data 20 as shown in FIG. 3. A physical level means the scale of map, and L pieces of the physical level data 20 means various maps on different scales for the entire area. Namely, the map data 10 can express the same area on various scales. The physical level data 20 can provide view levels of different users.

Additionally, the map display data 11, especially each piece of the physical level data 20, is composed of M pieces of layer data 30 and N pieces of tile data 40. M and N are natural numbers.

When information expressed in a map is classified according to attributes, the layer data 30 means map data that indicates information corresponding to and classified by each attribute. These attributes mean classification criteria for information that expresses a map. A single map is completed by a vertical pile of such layer data 30. For example, the attributes of the layer data 30 may include a water system, a boundary, a road, a building, a green area, and the like, depending on types of information displayed. If necessary, they may be subdivided into a contour, a continent boundary, a national boundary, an administrative boundary, an expressway, a general road, a trunk road, a subway line, an apartment complex, a school complex, a park and green, a public office, a general building, an apartment, a subway station, and the like.

The tile data 40 means given-sized horizontal division of map data. Respective pieces of the tile data 40 indicate map data of different areas. A single map is formed by a horizontal combination of such tile data 40.

As shown in FIG. 3, each piece of the physical level data 20 is composed of one or more layer data 30 and tile data 40. The number of the layer data 30 of each piece of the physical level data 20, namely M, is unvaried in all pieces of the physical level data 20, but the number of the tile data 40, namely N, may be varied according to pieces of the physical level data 20. This is caused by a difference in data amount among respective pieces of the physical level data 40. Normally the amount of information required to be expressed as map data increases in proportion to the size of scale. Therefore, in case of the physical level data 20 having a large scale, the number of the tile data 40 becomes greater.

For a real-time update of the map data including, as discussed above, one or more of the physical level data 20, one or more of the layer data 30, and one or more of the tile data 40, this invention allows a partial update in level, layer and tile units according to update conditions.

Parts to be updated by update conditions may be predetermined as shown in Table 1 given below.

TABLE 1

| | | | | Item | |
|---|---|---|---|---|---|
| | | State | | Level | Layer |
| 1 | f(A) | Standby | | Every level around BS-based current position | Every layer around BS-based current position |
| 2 | | Start | | Origination-destination summary level | Major roads, boundaries, IC/JC |
| 3 | | Driving | | Current level around current position | Roads, buildings |
| 4 | | End | | Level unreceived during driving | Layer unreceived during driving |
| 5 | f(B) | Low speed | | Every level around current position | Every layer around current position |
| 6 | | High speed | | Current level around current position | Main layer around current position |
| 7 | f(C) | Good | | Every level around current position | Every layer around current position |
| 8 | | Poor | | Current level around current position | Main layer around current position |
| 9 | f(A, B) | Standby | Low speed | Every level around current position | Every layer around current position |
| 10 | | | High speed | Current level around current position | Main layer around current position |
| 11 | | Start | Low speed | Origination-destination summary level | Major roads, boundaries, IC/JC |
| 12 | | | High speed | Origination-destination summary level | Major roads, boundaries |
| 13 | | Driving | Low speed | Current level around current position | Roads, buildings, stations |
| 14 | | | High speed | Current level around current position | Major roads, buildings |
| 15 | | End | Low speed | Level unreceived during driving | Layer unreceived during driving |
| 16 | | | High speed | Level unreceived during driving | Layer unreceived during driving |
| 17 | f(A, C) | Standby | Low speed | Every level around BS-based current position | Every layer around BS-based current position |
| 18 | | | High speed | Current level around BS-based current position | Main layer around BS-based current position |
| 19 | | Start | Low speed | Origination-destination summary level | Major roads, boundaries, IC/JC |

TABLE 1-continued

| | | | Item | |
|---|---|---|---|---|
| | State | Level | | Layer |
| 20 | | High speed | Origination-destination summary level | Major roads, boundaries |
| 21 | Driving | Low speed | Current level around current position | Roads, buildings, stations |
| 22 | | High speed | Current level around current position | Major roads, buildings |
| 23 | End | Low speed | Level unreceived during driving | Layer unreceived during driving |
| 24 | | High speed | | |
| 25 f(A, B, C) | Standby | Low speed Good | Every level around current position | Every layer around current position |
| 26 | | Poor | Every level around current position | Every layer around current position |
| 27 | | High speed Good | Current level around current position | Main layer around current position |
| 28 | | Poor | Current level around current position | Main layer around current position |
| 29 | Start | Low speed Good | Origination-destination summary level | Major roads, boundaries, IC/JC |
| 30 | | Poor | Origination-destination summary level | Major roads, boundaries, IC/JC |
| 31 | | High speed Good | Origination-destination summary level | Major roads |
| 32 | | Poor | Origination-destination summary level | Major roads, boundaries, IC/JC |
| 33 | Driving | Low speed Good | Current level around current position | Roads, buildings |
| 34 | | Poor | Current level around current position | Roads, buildings, stations |
| 35 | | High speed Good | Current level around current position | Major roads |
| 36 | | Poor | Current level around current position | Major roads, buildings |
| 37 | End | Low speed Good | Level unreceived during driving | Layer unreceived during driving |
| 38 | | Poor | | |
| 39 | | High speed Good | Level unreceived during driving | Layer unreceived during driving |
| 40 | | Poor | | |

Additionally, in still another embodiment of this invention, when classifying information for expressing a map according to attributes, the service device 100 constructs and stores map data as a plurality of pieces of layer data each of which shows information corresponding to and classified by each attribute. Map data formed of several pieces of layer data is updated in a unit of layer data. The service device 100 manages update information (version information) of map data in a layer data unit. Also, when there is a request for a map data update from the terminal device 200, the service device 100 provides the newest version of map data in a layer data unit, depending on an operation state of the terminal device 100.

The terminal device 200 outputs a route guidance screen on the basis of stored map data. Further, the terminal device 200 sends a request for a map data update and its operation state information to the service device 100, receives the newest version of map data from the service device 100 in a layer data unit, and applies it to the stored map data.

Figure 4:
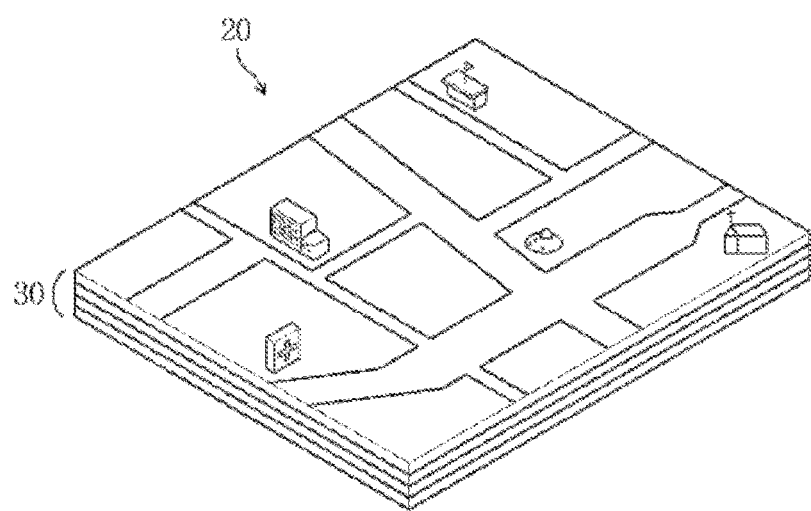
FIG. 4 is a schematic diagram illustrating a structure of map data in accordance with another embodiment of the present invention.

Namely, in still another embodiment of this invention, the map data 10, especially each piece of tile data 20 of the map data 10, is constructed using several pieces of layer data 30 each of which shows information corresponding to and classified by each attribute as shown in FIG. 4. These attributes mean classification criteria for information that expresses a map. A single piece of map data is completed by a vertical pile of several pieces of layer data 30.

The respective attributes of the layer data 30 may include a water system, a boundary, a road, a building, a green area, and the like, depending on types of information displayed. If necessary, they may be subdivided into a contour, a continent boundary, a national boundary, an administrative boundary, an expressway, a general road, a trunk road, a subway line, an apartment complex, a school complex, a park and green, a public office, a general building, an apartment, a subway station, and the like.

Figure 5:
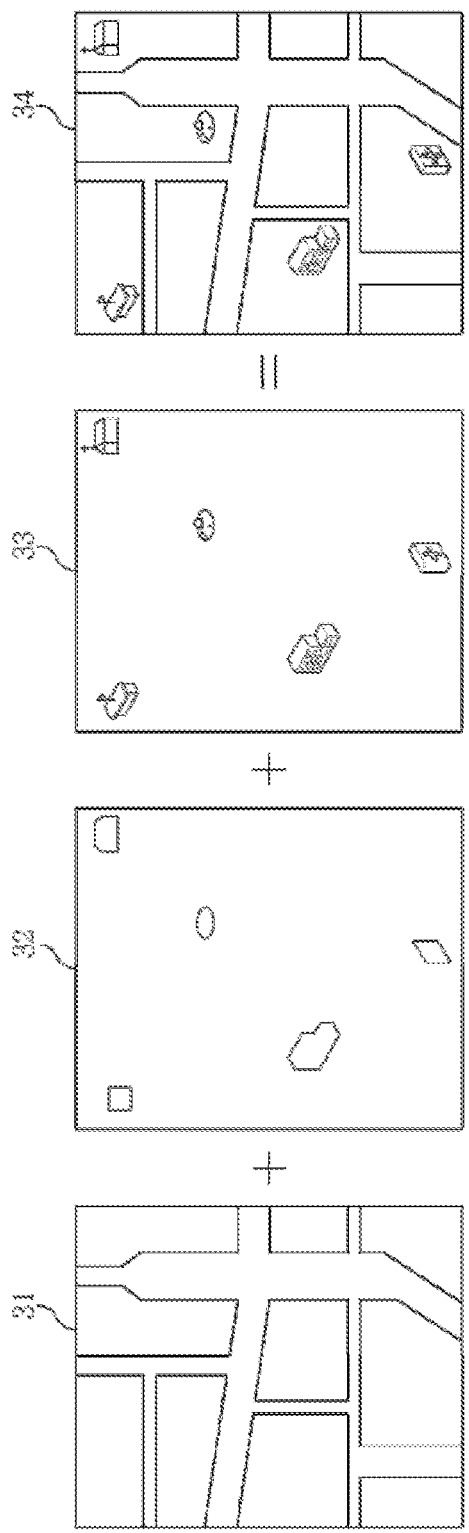
FIG. 5 is an exemplary diagram illustrating layer data of each attribute constructing map data in accordance with another embodiment of the present invention.

FIG. 5 is an exemplary diagram illustrating layer data of each attribute constructing map data in accordance with another embodiment of the present invention.

Referring to FIG. 5, when information expressed in a certain map is composed of general road information, general building information, and explanatory note information illustrating each building, map data 34 includes the first layer data 31 expressed by matching general roads with coordinates on the map, the second layer data 32 expressed by matching general buildings with such coordinates, and the third layer data 33 expressed by matching explanatory note data illustrating specific positions or facilities with such coordinates.

By piling up the first layer data 31, the second layer data 32, and the third layer data 33, the map data 34 in which general road information, general building information and explanatory note information are shown is realized.

This invention constructs map data, depending on an operating state of the terminal device 200, and updates such map data in a unit of layer data that shows corresponding attribute information.

An operating state of the terminal device 200 may include activation or not of route guidance, approach or not to destination during route guidance, and the like.

For example, before the terminal device 100 starts route guidance toward a selected destination, it updates the layer data of attribute associated with a route display toward a destination. Also, when the terminal device approaches a destination within a given distance during the route guidance, it updates the layer data of attribute associated with a position display of a destination. Here, the layer of attribute associated with a route display toward a destination means information that should be exactly offered during route guidance, and may be for instance the layer data that shows one or more among a road, a subway line and a bus line. The layer data of attribute associated with a position display of a destination means information required for exactly showing the position of a destination, and may be for instance the layer data that shows buildings including a station, a terminal, a general house, a school, a public office, a hotel, and an apartment.

Meanwhile, in the real-time map data updating system of this invention, the service device 100 may be realized in a server computing style or a cloud computing style. Here, the cloud computing means technology that services, in on-demand form, IT resources virtualized using internet technology such as hardware (server, storage, network, etc.), software (database, security, web server, etc.), service, data, and the like. In this invention, based on such cloud computing, the service device 100 provides computing resources, including at least one of software, hardware, data and service for a real-time map update, to the terminal device 200 through the network 10. For example, the service device 100 may provide map data or a storage space in which map data is stored. Also, the service device 100 may provide a program for executing route guidance based on map data to the terminal device 200. And also, according to this invention, the service device 100 may provide a real-time partial update service for map data in a combination of one or more of level, layer and tile units.

Hereinafter, in the real-time map data updating system of this invention, detailed configurations of the service device 100 and the terminal device 200 will be described with reference to FIGS. 6 and 7.

In the real-time map data updating system in accordance with one embodiment of this invention, essential functions of real-time map data update may be realized by the service device 100.

Figure 6:
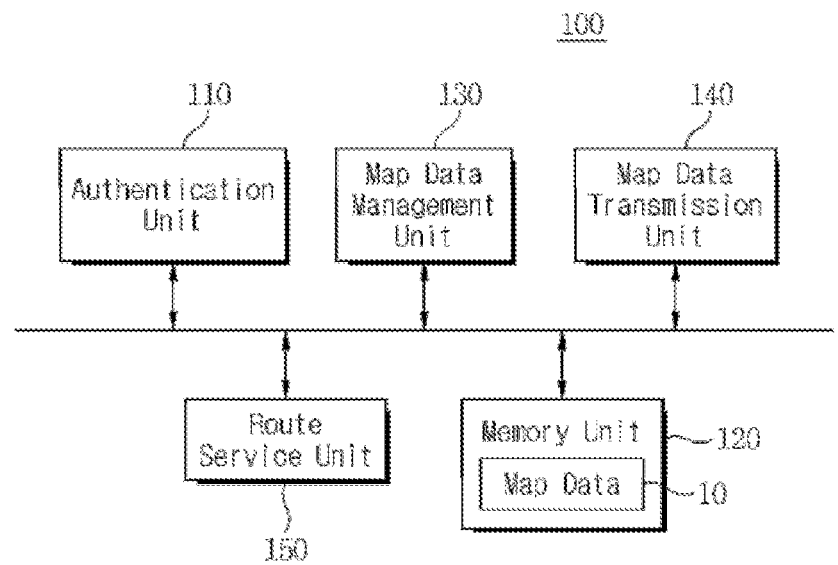
FIG. 6 is a block diagram illustrating a configuration of a service device in a real-time map data updating system in accordance with an embodiment of the present invention.

Referring to FIG. 6, the service device 100 for real-time map data update may include an authentication unit 110, a memory unit 120, a map data management unit 130, a map data transmission unit 140, and a route service unit 150.

The authentication unit 110 is a part for authenticating a service use right for a user of the terminal device 200. A service may be provided to only the terminal device 200 of users having a use right authenticated by the authentication unit 110. By using, for example, identification information of the terminal device 200, ID and password of a user, or the like, the authentication unit 110 may determine whether the user has a use right.

The memory unit 120 is configured to store data required for the operation of the service device 100, and basically stores the newest version of the map data 10. Further, the memory unit 120 may store various versions of the map data 10 together.

In one embodiment of this invention, a specific version of the map data 10 stored in the memory unit 120 is composed of one or more of the physical level data 20, one or more of the layer data 30, and one or more of the tile data 30 as earlier discussed with reference to FIGS. 2 and 3. Also, the memory unit 120 may further store an update table that indicates parts of map data to be updated according to predetermined update conditions.

In another embodiment of this invention, the memory unit 120 may store map data composed of several pieces of layer data each of which shows information corresponding to and classified by each attribute.

In this case, the memory unit 120 may store the newest version of map data or all respective versions of map data.

Next, the map data management unit 130 is a means for managing the version of map data stored in the memory unit 120. According to one embodiment of this invention, the map data management unit 130 determines data, as a combination of one or more of level, layer and tile units, to be updated among map data stored in the terminal device 200, depending on update conditions of the terminal device 200. For this, the map data management unit 120 may check update conditions of the terminal device 200 by collecting a variety of environment information associated with the terminal device 200 from the terminal device 200 or any other external device, or may directly receive update conditions from the terminal device 200.

Update conditions are information that indicates one or more a travel state, a travel speed, and a network state. The travel state may be classified into standby, start of driving, during driving, and end of driving, in connection with a route guidance service. The travel speed may be classified into high speed and low speed which correspond to a moving speed of the terminal device 200. The network state which indicates data network conditions between the terminal device 200 and the service device 100 may be classified into poor and good.

Particularly, the map data management unit 130 may determine parts to be updated, as a combination of level, layer and tile units, depending on update conditions selected referring to the update table stored in the memory unit 120.

Referring to Table 1 for example, if the terminal device 200 moves at a low speed in a standby state, the map data management unit 130 extracts, as parts to be updated, main layer data of every physical level data for area around a current position.

Additionally, in another embodiment of this invention, the map data management unit 130 determines layer data to be updated among map data stored in the terminal device 200, depending on an operating state of the terminal device 200. For example, when the terminal device 100 starts route guidance toward a selected destination, the map data management unit 130 may determine the layer data of attribute associated with a route display toward a destination as layer data to be updated. Also, when the terminal device 200 approaches a destination within a given distance during the route guidance, the map data management unit 130 may determine the layer data of attribute associated with a position display of a destination as layer data to be updated. At this time, the map data management unit 130 may receive, from the terminal device 200, the position of the terminal device 200 and information on whether to perform route guidance.

Next, the map data transmission unit 140 retrieves, from the memory unit 120, the layer data for update determined by the map data management unit 130 and then transmits it to the terminal device 200.

Thus the terminal device 200 may update map data in a combination of one or more of level, tile and layer units by replacing corresponding parts of stored map data with received layer data. Particularly, in another embodiment of this invention, the terminal device 200 may perform a map data update in a layer data unit by replacing corresponding layer data of stored map data with received layer data.

Furthermore, the route service unit 150 is a means for providing route information at the request of the terminal device 200. More specifically, the route service unit 150 extracts a route from an origination to a destination on the basis of map data in response to a request for route information from the terminal device 200 and provides it to the terminal device 200. If necessary, the route service unit 150 may be omitted. For example, when the terminal device 200 performs a route search function, the route service unit 150 may be omitted.

In another embodiment of this invention, essential functions of real-time map data update may be realized through the terminal device 200.

Figure 7:
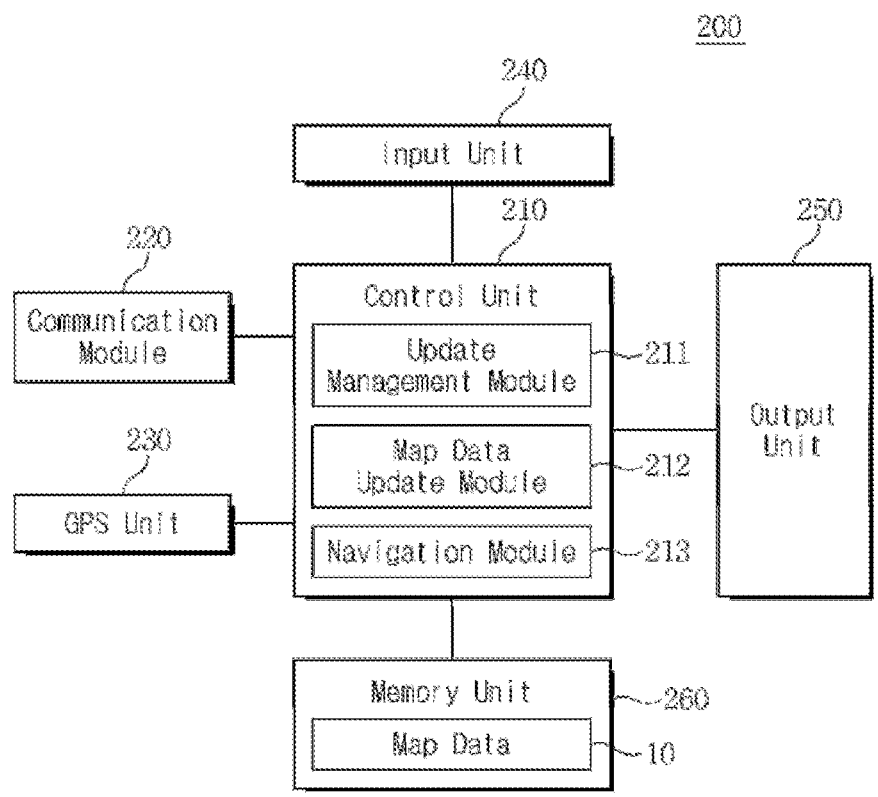
FIG. 7 is a block diagram illustrating a configuration of a terminal device in a real-time map data updating system in accordance with an embodiment of the present invention.

Referring to FIG. 7, the terminal device 200 in an embodiment of this invention may include a control unit 210, a communication unit 220, a GPS unit 230, an input unit 240, an output unit 250, and a memory unit 260.

The control unit 210 is a means for controlling the whole operation of the terminal device 200. In this invention, the control unit 210 outputs a route guidance screen based on map data and, depending on update conditions corresponding to operating environments, performs a real-time update in a combination of one or more of level, tile and layer units.

For this, the control unit 210 may include an update management module 211 and a map data update module 212. The update management module 211 and the map data update module 212 may be realized by means of hardware, software, or their combination. For example, the update management module 211 and the map data update module 212 may be realized using a set of a microprocessor (MPU) and a program that is programmed to execute a relevant function.

The update management module 211 for a real-time update management of map data stored in the terminal device 200 performs a real-time check for operating environments of the terminal device 200 and determines parts to be updated in map data as a combination of one or more of level, layer and tile units. For this, the update management module 211 may refer to an update table stored in the memory unit 260 to define update parts of map data according to update conditions.

The map data update module 212 receives, from the service device 100, data of parts determined by the update management module 211 and performs a partial update of map data by applying the received data to map data stored in the memory unit 260.

Through this, the terminal device 200 can effectively update the map data according to operating environments.

Additionally, in case of another embodiment of this invention, the update management module 211 of the control unit 210 determines layer data to be updated by performing a real-time check for operating environments of the terminal device 200. More specifically, before route guidance toward a destination is started, the update management module 211 may determine the layer data of attribute associated with a route display toward a destination as the layer data to be updated. Also, when approaching a destination within a given distance during the route guidance, the update management module 211 may determine the layer data of attribute associated with a position display of a destination as the layer data to be updated.

Also, the map data update module 212 receives, from the service device, layer data determined by the update management module and applies the received layer data to map data stored in the memory unit 260.

Through this, the control unit 210 performs a real-time update for actually required map data in a tile unit during the operation of navigation. Therefore, a user does not need to wait while the entire data of map data is received, and can use a route guidance service more quickly.

The communication unit 220 transmits and receives data through the network 300. Specifically, by communicating with the service device 100 through the network 300, the communication unit 220 can transmit version information of map data stored in the terminal device 200, operating environment information, or information about data to be updated, and receive, from the service device 100, data of parts corresponding to a combination of one or more of level, tile and layer units, or the newest version of layer data. Further, after transmitting a route information request message including origination and destination information, the communication unit 220 may receive corresponding route information.

The GPS (Global Positioning System) unit 230 detects one or more of a current position, moving direction and speed of the terminal device 200. This information of position, moving direction and speed detected by the GPS unit 230 may be used to perform a navigation function in the control unit 210, namely, to track and display on a map a current position and moving direction detected by the GPS unit 230 or to display a route searched on the basis of an origination and a destination together with a current position, moving direction and speed of the terminal device 200. Also, information of position, moving direction and speed detected by the GPS unit 230 may be used for the update management module 211 of the control unit 210 to determine parts to be updated on the basis of a current position.

The input unit 240 is a means for creating a user input signal for manipulating the terminal device 200 and, specifically, used to input an origination and a destination for navigation. The input unit 240 may be realized using various types of input means including, for example, one or more of key input means, touch input means, gesture input means, and voice input means. Here, the key input means is to create a signal corresponding to a selected key and includes a keypad or a keyboard. The touch input means is to recognize an input action by detecting a touch on a specific point by a user and includes a touch pad, a touch screen, or a touch sensor. The gesture input means is to recognize, as a specific input signal, a predetermined user gesture such as shaking or moving the terminal device, approaching the terminal device, or blinking eyes and includes at least one of a geomagnetic sensor, an acceleration sensor, an altimeter, a gyro sensor, and a proximity sensor.

The output unit 250 outputs a route guide screen based on map data under the control of the control unit 210. In this case, a background map displayed together with a route is realized on the basis of map data partially updated according to update conditions by the control unit 210. In another case, the background map displayed together with a route is realized on the basis of map data updated in real time in a layer data unit by the control unit 210.

The memory unit 260 stores the map data 10. The map data stored in the memory unit 260 of the terminal device 200 is composed of one or more of the physical level data 20, one or more of the layer data 30, and one or more of the tile data 30, as earlier discussed with reference to FIGS. 2 and 3. Also, the memory unit 120 may further store an update table (see Table 1) that indicates parts of map data to be updated according to predetermined update conditions. In another case, map data stored in the memory unit 260 is composed of a variety of information as shown in FIGS. 4 and 5, and especially includes several pieces of layer data each of which shows information corresponding to and classified by each attribute. Also, the memory unit 260 may store version information about each respective map data.

Now, some embodiments of a real-time map data updating method performed on the basis of the above-discussed configurations will be described with reference to FIGS. 8 to 12.

Figure 8:
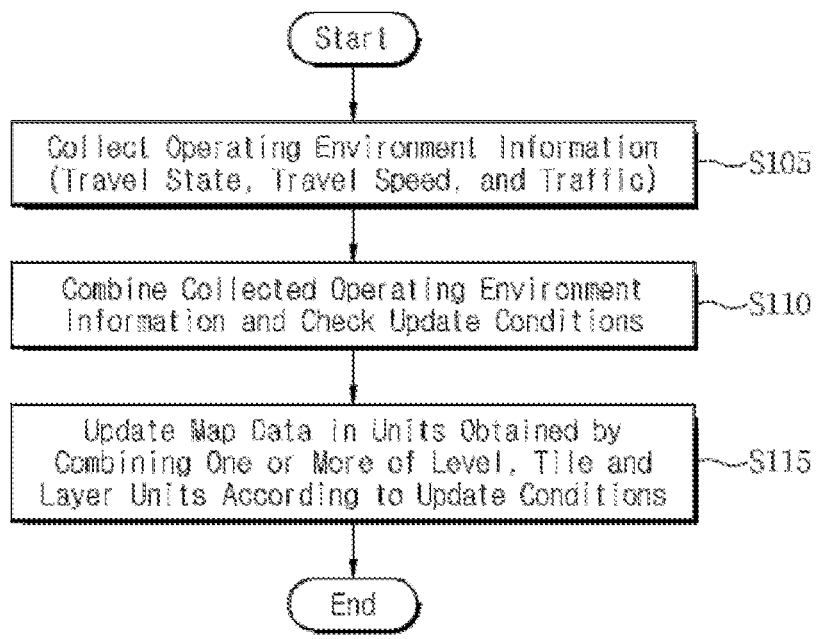
FIG. 8 is a flow diagram illustrating a basic concept of a real-time map data updating method in accordance with one embodiment of the present invention.

FIG. 8 is a flow diagram illustrating a basic concept of a real-time map data updating method in accordance with one embodiment of the present invention.

Referring to FIG. 8, in this invention, for a real-time map data update, the first step is to collect operating environment information in the terminal device 200 (S105). Here, the operating environment information is basic information used to determine update conditions and may include, for example, a travel state value matched with route guidance in the terminal device 200, a moving speed value of the terminal device 200, a data transfer rate value or data transfer time between the terminal device 200 and the service device 100.

The next step is to check update conditions for the terminal device 200 by comparing the collected operating environment information with predetermined criteria (S110). Update conditions may include one or more of a travel state indicated as one of standby, start of driving, during driving, and end of driving, a travel speed indicated as high speed or low speed, and a network state indicated as poor or good. For example, the travel state may use intactly a collected travel state value. Through a comparison between a predetermined reference speed and a collected driving speed, the travel speed may be determined as high speed when the collected driving speed is greater than the reference speed or as low speed when lower. Similarly, by comparing a collected data transfer rate value or data transfer time with a reference value, the network state may be determined as poor when the collected data transfer rate value is lower than the reference value or when the collected data transfer time is greater than the reference value or as good in reverse case.

After update conditions are checked, the next step is to select parts of map data to be updated in response to the checked update conditions, as a combination of one or more of level, tile and layer units, by referring to an update table as shown in Table 1, and then to update the selected parts of data (S115).

The aforementioned steps (S105, S110, and S115) may be performed through the service device 100 or the terminal device 200. Respective embodiments will be described with reference to FIGS. 9 and 10.

Figure 9:
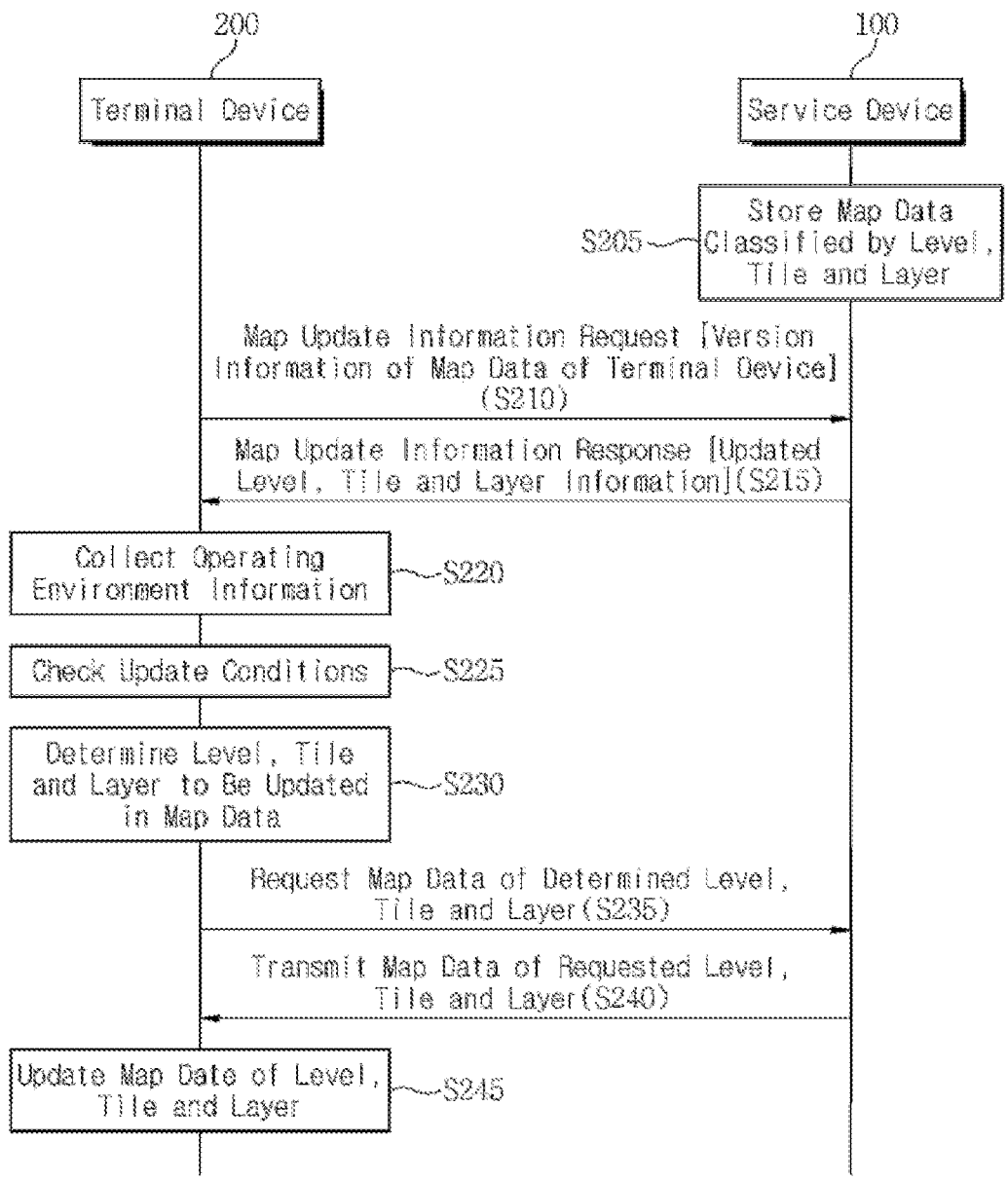
FIG. 9 is a flow diagram illustrating an example of a real-time map data updating method in accordance with one embodiment of the present invention.

FIG. 9 is a flow diagram illustrating an example of a real-time map data updating method in accordance with one embodiment of the present invention.

Referring to FIG. 9, in one embodiment of this invention, the service device 100 stores map data including one or more of the physical level data 20, one or more of the layer data 30, and one or more of the tile data 40 (S205), as discussed with reference to FIGS. 2 and 3. The map data of the service device 100 is updated in a certain cycle or whenever geographic information is changed, and update version information of the map data is managed in level, layer and tile units.

The terminal device 200 stores map data and may perform a route guidance function based on the stored map data.

Further, for update of the stored map data, the terminal device 200 may send a request for map update information to the service terminal 100 (S210).

This step (S210) is an initial action of the terminal device 200 and may be made once at power-on or performed at every predetermined time, e.g., on a weekly or monthly basis, according to map update schedule.

The service device 100 receiving a map update information request from the terminal device 200 compares the newest version of its own map data with the version of map data stored in the terminal device 200 in level, tile and layer units, then extracts update information in level, tile and layer units from updated parts, and provides the extracted update information as a map update information response to the terminal device 200 (S215). At this time, the service device 100 may just compare the version of its own map data with that of map data stored in the terminal device 200 and then provide, as update information, only whether update is required or not.

Thereafter, the terminal device 200 may perform a route guidance function based on stored map data. However, regardless of a route guidance function of the terminal device 200, an updating process is further performed as follows.

Namely, the terminal device 200 collects in real time operating environment information for update condition determination (S220). As discussed above, the operating environment information may include a travel state value of the terminal device 200, a moving speed value of the terminal device 200, a data transfer rate value or data transfer time between the terminal device 200 and the service device 100.

Thereafter, the terminal device checks update conditions by comparing the collected operating environment information with predetermined criteria (S225). Update conditions may include one or more of a travel state indicated as one of standby, start of driving, during driving, and end of driving, a travel speed indicated as high speed or low speed, and a network state indicated as poor or good.

After update conditions are checked, the terminal device 200 determines parts of map data to be updated in response to the checked update conditions, as a combination of one or more of level, tile and layer units, by referring to an update table as shown in Table 1 (S230).

Then the terminal device sends a request for data parts to be updated to the service device 100 (S235). At this time, one or more of level information, tile information and layer information indicating parts of map data to be updated may be sent together.

The service device 100 extracts parts of map data requested by the terminal device 200 in level, tile and layer units and then sends it to the terminal device 200 (S240).

The terminal device 200 receiving data of requested parts performs update by applying the received parts to stored map data (S245).

After a partial update of map data is performed as above, a route guidance function is performed on the basis of partially updated map data.

Figure 10:
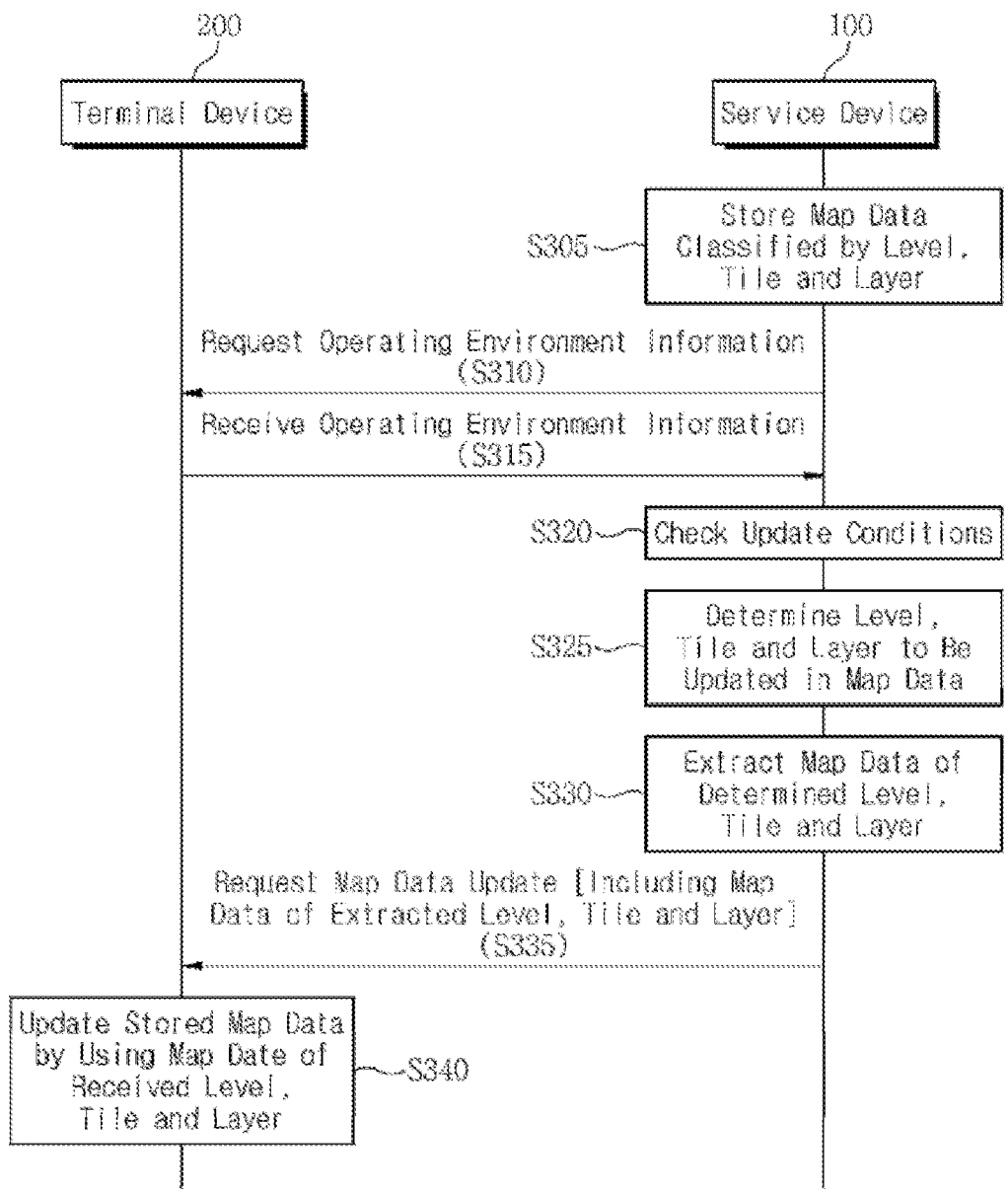
FIG. 10 is a flow diagram illustrating another example of a real-time map data updating method in accordance with one embodiment of the present invention.

FIG. 10 is a flow diagram illustrating another example of a real-time map data updating method in accordance with one embodiment of the present invention.

Referring to FIG. 10, in another embodiment of this invention, the service device 100 stores map data including one or more of the physical level data 20, one or more of the layer data 30, and one or more of the tile data 40 (S305), as discussed with reference to FIGS. 2 and 3. The map data of the service device 100 is updated in a certain cycle or whenever geographic information is changed, and update version information of the map data is managed in level, layer and tile units.

The terminal device 200 also stores map data and may perform a route guidance function based on the stored map data.

At this time, for update condition determination, the service device 100 collects in real time operating environment information by sending a request to the terminal device 200 (S310, 315). As discussed above, the operating environment information may include a travel state value of the terminal device 200, a moving speed value of the terminal device 200, a data transfer rate value or data transfer time between the terminal device 200 and the service device 100. Here, a data transfer rate value or data transfer time between the terminal device 200 and the service device 100 may be measured at the service device 100.

Thereafter, the service device 100 determines update conditions by comparing the collected operating environment information with predetermined criteria (S320). Update conditions may include one or more of a travel state indicated as one of standby, start of driving, during driving, and end of driving, a travel speed indicated as high speed or low speed, and a network state indicated as poor or good.

After update conditions are checked, the service device 100 determines parts of map data to be updated in response to the checked update conditions, as a combination of one or more of level, tile and layer units, by referring to an update table as shown in Table 1 (S325).

Then the service device 100 extracts data for determined update parts (S330).

Thereafter, the service device 100 sends the extracted data together with a request of a partial update of map data to the terminal device 200 (S335). This transmission of extracted data may require transmission permission of the terminal device 200.

The terminal device 200 receiving data of parts to be updated according to a combination of one or more of level, tile and layer units from the service device 100 performs update by applying the received parts to stored map data (S340).

The terminal device 200 may receive data of updated parts from the service device 100 at any time in operation and then performs route guidance based on partially updated map data by applying the received parts to map data.

Figure 11:
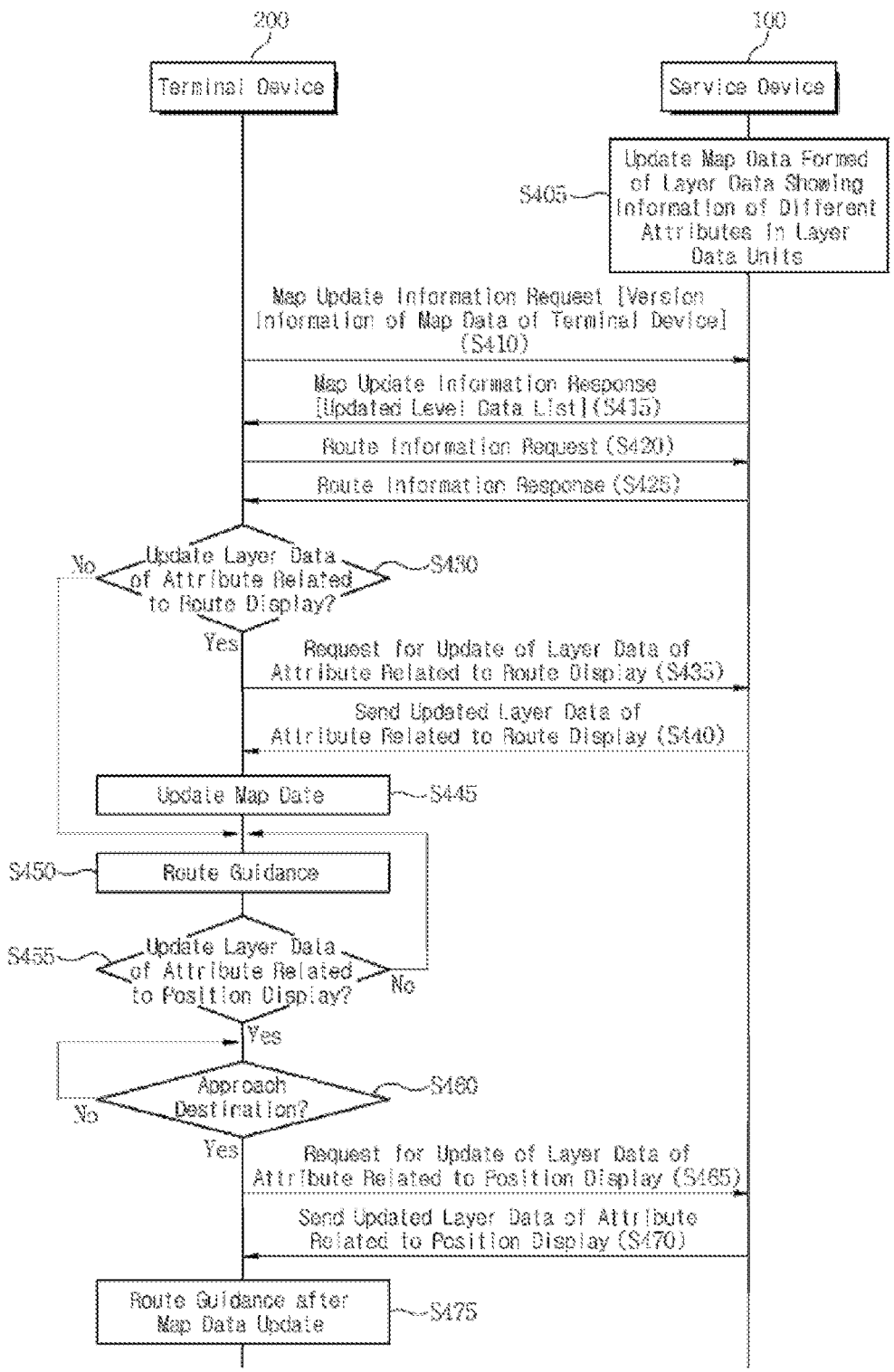
FIG. 11 is a flow diagram illustrating an example of a real-time map data updating method in accordance with another embodiment of the present invention.

FIG. 11 is a flow diagram illustrating an example of a real-time map data updating method in accordance with another embodiment of the present invention.

Referring to FIG. 11, in another embodiment of this invention, the service device 100 classifies pieces of information expressing a map according to their attributes and then stores map data formed of pieces of layer data each of which shows information corresponding to and classified by each attribute (S405). In the map data stored in the service device 100, map information varied as time passed may be updated in layer data units.

The terminal device 200 stores map data and also performs a route guidance function based on the stored map data.

For update of the stored map data, the terminal device 200 may send a request for map update information to the service terminal 100 (S410).

This step (S410) is an initial action of the terminal device 200 and may be made once at power-on or performed at every predetermined time, e.g., on a weekly or monthly basis, according to map update schedule.

The service device 100 receiving a map update information request from the terminal device 200 compares the newest version of its own map data with the version of map data stored in the terminal device 200, then extracts an updated layer data list, and provides the updated layer data list as a map update information response to the terminal device 200 (S415). Here, the updated layer list means a list of layer data to have to be updated in map data of the terminal device 200 on the basis of the newest version of map data. At this time, the newest version information of map data, namely, being used as basis of the update layer list, may be sent together.

Further, in reply to user's route guidance request, the terminal device 200 may request route information by sending an origination and a destination to the service device 100 (S420). Then the terminal device 200 may receive, from the service device 100, a response of route information extracted through a route search from an origination to a destination (S425). The aforesaid steps S410 to S425 may be omitted if necessary. Especially, if the terminal device 200 has a route search function, the aforesaid steps S420 and S425 may be omitted.

Additionally, before starting route guidance up to a destination, the terminal device 200 checks whether there is layer data to be updated among layer data of attribute associated with a route display up to a destination (S430). This may be accomplished by checking, on the basis of the updated layer data list received in step S415, whether layer data of attribute associated with a route display has been updated. Here, layer data of attribute associated with a route display may be specifically layer data that shows one or more of a road, a subway line, and a bus line.

As the result of check, if update for layer data of attribute associated with a route display is needed, the terminal device sends a request for layer data of attribute associated with a route display to the service device 100 (S435) and receives the newest version of relevant layer data from the service device 100 (S440).

Then the terminal device 200 applies layer data of attribute associated with a route display to the stored map data and, based the on map data, performs route guidance up to a destination (S450). Therefore, route guidance to a destination is performed on the basis of the newest road information.

Also, based on the updated layer data list received in step S415, the terminal device 200 checks whether there is a need to update layer data of attribute associated with a position display (S455). Here, layer data of attribute associated with a position display may be layer data that shows buildings including a station, a terminal, a general house, a school, a public office, a hotel, and an apartment.

As the result of check, if update for layer data of attribute associated with a position display is not needed, the terminal device performs route guidance based on the stored map data without a real-time map data update until it arrives at a destination.

On the contrary, if update for layer data of attribute associated with a position display is needed, the terminal device sends a request for layer data of attribute associated with a position display to the service device 100, receives it, and performs update by applying it to the stored map data (S465, S470).

Then the terminal device performs route guidance from a current position to a destination, based on map data having updated layer data of attribute associated with a position display of the destination (S475). Therefore, according to the approach toward the destination, more exact route guidance can be performed on the basis of a map to which the newest geographic information around the destination is applied.

Meanwhile, in another embodiment of this invention, main processing for a real-time map data update in layer data units may be performed through the service device 100.

Figure 12:
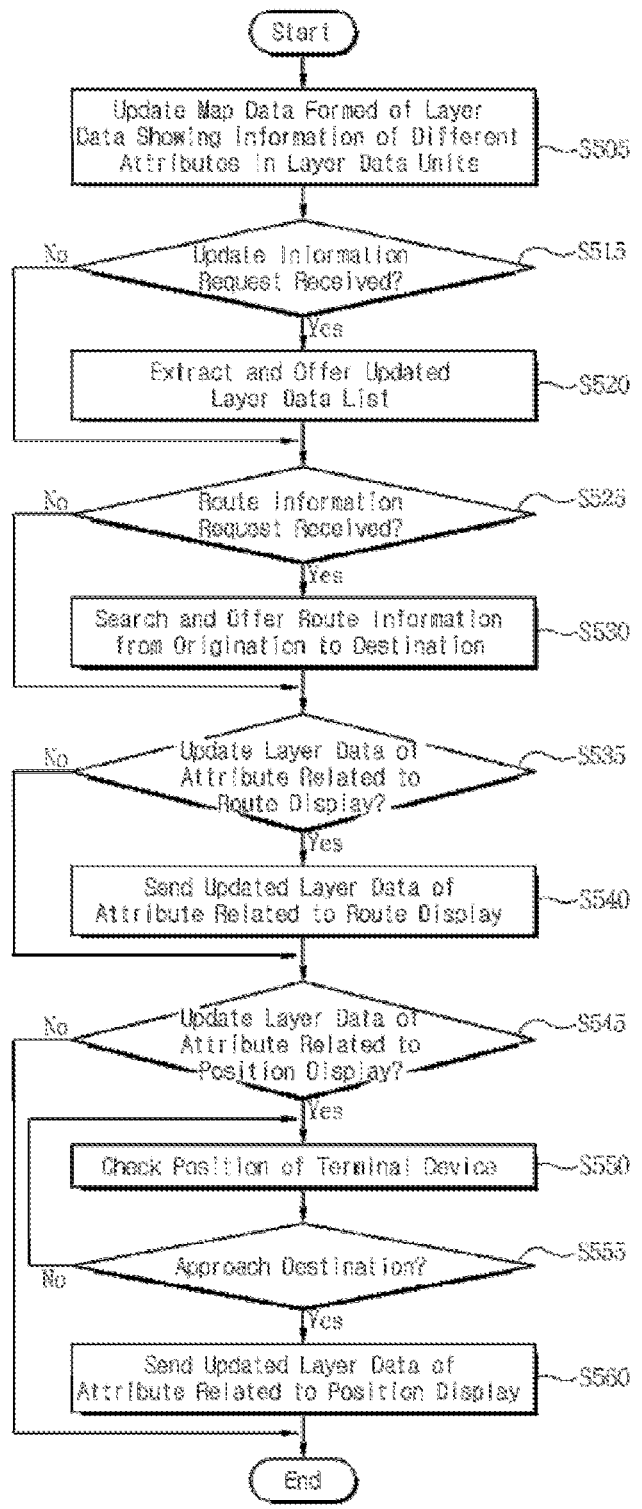
FIG. 12 is a flow diagram illustrating another example of a real-time map data updating method in accordance with another embodiment of the present invention.

FIG. 12 is a flow diagram illustrating another example of a real-time map data updating method in accordance with another embodiment of the present invention.

Referring to FIG. 12, the service device 100 classifies pieces of information expressing a map according to their attributes and then stores map data formed of pieces of layer data each of which shows information corresponding to and classified by each attribute (S505). In the map data stored in the service device 100, map information varied as time passed may be updated in layer data units. Further, update version information of map data may be managed in layer data units.

Additionally, the service device 100 may receive a map update information request from the terminal device 200 (S515). In this case, the service device 100 compares the newest version of its own map data with the version of map data stored in the terminal device 200, then extracts an updated layer data list, and provides the updated layer data list as a map update information response to the terminal device 200 (S520). Here, the updated layer list means a list of layer data to have to be updated in map data of the terminal device 200 on the basis of the newest version of map data. At this time, the newest version information of map data, namely, being used as basis of the update layer list, may be sent together.

Further, the service device 100 may receive, from the terminal device 200, a request for route information from an origination to a destination (S525). Through a response message, the service device may provide the terminal device 200 with route information extracted through a route search from an origination to a destination (S530). The aforesaid steps S515 to S530 may be omitted if necessary. Especially, if the terminal device 200 has a route search function, the aforesaid steps S520 and S525 may be omitted.

Additionally, the service device 100 may perform a real-time map data update in layer data units by checking an operating state of the terminal device that stores map data.

Specifically, the service device 100 determines whether to update layer data associated with a route display in map data of the terminal device 100 (S535). More specifically, as the result of checking version information of map data and an operating state of the terminal device, if route guidance up to a destination is not started, and if the version of map data associated with a route display is dissimilar, the service device 100 determines that update for layer data associated with a route display is needed.

As the result of determination, if update for layer data associated with a route display is needed, the service device sends layer data of attribute associated with a route display to the terminal device such that relevant parts of map data stored in the terminal device 200 can be updated (S540).

Additionally, the service device 100 determines whether to update layer data of attribute associated with a position display (S545). Specifically, if the terminal device 200 is performing route guidance, and if the version of layer data of attribute associated with a position display of a destination is dissimilar, the service device 100 determines that update for layer data of attribute associated with a position display is needed.

As the result of determination, if update for layer data of attribute associated with a position display is needed, the service device 100 checks the position of the terminal device 200 (S550) and further checks whether the terminal device 200 approaches a destination within a given distance (S555).

As the result of check, if the terminal device 200 approaches a destination within a given distance, the service device 100 sends layer data of attribute associated with a position display of the destination to the terminal device such that relevant parts of map data stored in the terminal device 200 can be updated (S560).

Through the above operations, the service device 100 updates map data stored in the terminal device in layer data units according to its operating state, and allows reliable route guidance with the minimum data update.

The real-time map data updating method in this invention may be implemented in the form of software being readable through a variety of computer means and be recorded in any computer-readable medium. Here, this medium may contain, alone or in combination, program instructions, data files, data structures, and the like. These program instructions recorded in the medium may be specially designed and constructed for the present invention or well known to persons in the field of computer software. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions may include machine language codes made by a complier and high-level language codes executable in a computer using an interpreter or the like. These hardware devices may be configured to operating as one or more of software to perform the operation of this invention, and vice versa.

While this invention has been particularly shown and described with reference to an exemplary embodiment thereof, it will be understood by those skilled in the art that various changes in form and details may be made therein without departing from the subject matter of the invention. Specific terms used in this disclosure and drawings are used for illustrative purposes and not to be considered as a limitation of the present invention.

The present invention may be used for a variety of terminal devices that store map data and perform a specific function based on the stored map data, and particularly, may provide route guidance based on the newest geographic information with minimized user's waiting time by partially updating in real time the stored map data in a combination of one or more of physical level, tile and layer units according to update conditions of the terminal device.

Also, in update of map data, this invention allows an effective update with minimized user inconvenience by updating in real time just the minimum information required for operation and transmissible based on a travel state and speed of the terminal device and a network state.

And also, in update of map data, this invention allows an effective update with minimized user inconvenience by updating in real time just the minimum information required for exact route guidance based on an operating state of the terminal device.

As a result, this invention can remarkably enhance user convenience by taking advantages of both a map-stored system and a map-streaming system.

What is claimed is:

1. A real-time map data updating system comprising:
   a service device configured to store map data including one or more of physical level data which expresses a specific area on one or more scales, one or more of tile data which indicates given-sized division of the specific area, and one or more of layer data which shows classified information on a map, and to provide the map data in one or more units of level, layer and tile units at an update request of a terminal device; and the terminal device configured to perform a route guidance function based on the stored map data, to determine parts for update in the stored map data in level, layer and tile units according to update conditions, to receive map data of the determined parts by sending a request to the service device, and to apply the received map data to the stored map data.

2. The real-time map data updating system of claim 1, wherein the service device is further configured to classify pieces of information expressing the map data according to attributes, to construct map data using a plurality of pieces of layer data each of which shows information corresponding to and classified by each attribute, and to manage an update version of the map data by the respective layer data.

3. A service device comprising:
   a memory unit configured to store map data including one or more of physical level data which expresses a specific area on one or more scales, one or more of tile data which indicates given-sized division of the specific area, and one or more of layer data which shows classified information on a map;
   a map data management unit configured to manage versions of the map data, and to determine parts for update in the map data in a combination of one or more of level, layer and tile units according to update conditions of a terminal device; and
   a map data transmission unit configured to retrieve, from the memory unit, map data of the parts for update determined by the map data management unit, and to transmit the retrieved map data to the terminal device.

4. The service device of claim 3, wherein the update conditions includes one or more of a travel state of the terminal device, a travel speed of the terminal device, and a network state.

5. The service device of claim 3, further comprising:
   an authentication unit configured to authenticate a service use right for a user of the terminal device.

6. The service device of claim 3, further comprising:
   a route service unit configured to extract route information from an origination to a destination in response to a request for the route information from the terminal device, and to provide the extracted route information to the terminal device.

7. The service device of claim 3, wherein the map data management unit is further configured to collect in real time operating environment information from the terminal device, and to determine the update conditions on the basis of the collected operating environment information.

8. The service device of claim 3, wherein the map data management unit is further configured to classify pieces of information expressing a map according to attributes, to store map data, in the memory unit, formed of a plurality of pieces of layer data each of which shows information corresponding to and classified by each attribute, and to determine layer data to be updated in map data of the terminal device according to an operating state of the terminal device.

9. The service device of claim 8, wherein the map data management unit is further configured to, when the terminal device performs route guidance toward a specific destination, determine layer data of attribute associated with a route display toward the destination as the layer data to be updated, and when the terminal device approaches the destination within a given distance, to determine layer data of attribute associated with a position display of the destination as the layer data to be updated.

10. The service device of claim 9, wherein the map data management unit is further configured to receive, from the terminal device, a position of the terminal device and information on whether to perform route guidance.

11. The service device of claim 9, wherein the layer data of attribute associated with a route display toward the destination is layer data that shows one or more of a road, a subway line, and a bus line.

12. The service device of claim 9, wherein the layer data of attribute associated with a position display of the destination is layer data that shows buildings including a station, a terminal, a general house, a school, a public office, a hotel, and an apartment.

13. A terminal device comprising:
    a communication unit configured to transmit and receive data through a network;
    a memory unit configured to store map data including one or more of physical level data which expresses a specific area on one or more scales, one or more of tile data which indicates given-sized division of the specific area, and one or more of layer data which shows classified information on a map;
    a control unit configured to perform a route guidance function based on the map data, to determine update parts in the map data in a combination of one or more of level, tile and layer units according to update conditions, to receive map data of the determined parts from a service device, and to apply the received map data to the stored map data; and
    a display unit configured to display a route based on the map data under the control of the control unit.

14. The terminal device of claim 13, wherein the control unit includes:
    an update management module configured to check the update conditions by collecting in real time operating environment information, and to determine the update parts in the map data in the combination of one or more of level, tile and layer units according to the update conditions; and
    a map data update module configured to receive, by sending a request to the service device, map data of the update parts corresponding to the combination of one or more of level, tile and layer units determined by the update management module, and to apply the received map data to the stored map data.

15. The terminal device of claim 13, wherein the memory unit is further configured to store an update table that defines update parts expressed as combinations of one or more of level, tile and layer units according to predetermined update conditions, and
    wherein the control unit is further configured to determine the update parts by referring to the update table.

16. The terminal device of claim 13, further comprising:
    a GPS unit configured to detect and offer one or more of a position, moving direction and speed of the terminal device to be used for the route guidance and update parts determination.

17. The terminal device of claim 13, wherein the update conditions includes one or more of a travel state of the terminal device, a travel speed of the terminal device, and a network state.

18. The terminal device of claim 13, wherein when information expressing a map is classified according to attributes, one or more of the layer data shows information corresponding to and classified by each attribute.

19. The terminal device of claim 18, wherein the control unit includes:
an update management module configured to check in real time an operating state of the terminal device, and to determine layer data showing information of attribute required for the terminal device as layer data to be updated; and
a map data update module configured to receive, by sending a request to the service device, the layer data determined by the update management module, and to apply the received map data to the stored map data.

20. The terminal device of claim 19, wherein the update management module is further configured to, before route guidance toward a destination is started, determine layer data of attribute associated with a route display toward the destination as the layer data to be updated, and when the terminal device approaches the destination within a given distance during the route guidance, to determine layer data of attribute associated with a position display of the destination as the layer data to be updated.

21. A real-time map data updating method performed by at least one processor, the method comprising:
collecting, by the at least one processor, operating environment information of a terminal device as basic information for update condition determination;
checking, by the at least one processor, update conditions of the terminal device by comparing the collected operating environment information with predetermined criteria, the update conditions including one or more of a travel state, a travel speed, and a network state;
in response to the checked update conditions, selecting, by the at least one processor, update parts of map data in a combination of one or more of level, tile and layer units; and
updating, by the at least one processor, map data of the selected update parts.

22. A real-time map data updating method performed by a processor of a real-time map data updating system, the method comprising:
after classifying information expressing a map according to attributes, storing, by the processor, map data formed of a plurality of pieces of layer data each of which shows information corresponding to and classified by each attribute;
checking, by the processor, an operating state of a terminal device storing map data;
if route guidance toward a destination is not started as the result of the checking, transmitting, by the processor, layer data of attribute associated with a route display toward the destination to the terminal device; and
if the terminal device approaches the destination within a given distance during the route guidance as the result of the checking, transmitting, by the processor, layer data of attribute associated with a position display of the destination to the terminal device.

23. A real-time map data updating method performed by a processor of a terminal device of a real-time map data updating system, the method comprising:
after classifying information expressing a map according to attributes, storing, by the processor, map data formed of a plurality of pieces of layer data each of which shows information corresponding to and classified by each attribute;
when there is a request for route guidance, updating, by the processor, layer data of attribute associated with a route display toward a destination in the map data;
performing, by the processor, the route guidance toward the destination, based on the map data having the updated layer data of attribute associated with a route display toward the destination;
checking, by the processor, whether approaching the destination within a given distance during the route guidance;
if approaching the destination within a given distance, updating, by the processor, layer data of attribute associated with a position display of the destination in the map data; and
performing, by the processor, the route guidance toward the destination, based on the map data having the updated layer data of attribute associated with a position display of the destination.

24. The real-time map data updating method of claim 23, wherein the updating comprises:
receiving, by the processor, the newest version of the layer data of relevant attribute from a service device, and
replacing, by the processor, the layer data in the map data with the received newest version.

25. A non-transitory computer-readable medium recording thereon a program for causing at least one processor to execute:
collecting operating environment information of a terminal device as basic information for update condition determination;
checking update conditions of the terminal device by comparing the collected operating environment information with predetermined criteria, the update conditions including one or more of a travel state, a travel speed, and a network state;
in response to the checked update conditions, selecting update parts of map data in a combination of one or more of level, tile and layer units; and
updating map data of the selected update parts.

26. A non-transitory computer-readable medium having thereon a program for causing at least one processor to execute:
after classifying information expressing a map according to attributes, storing map data formed of a plurality of pieces of layer data each of which shows information corresponding to and classified by each attribute;
when there is a request for route guidance, updating layer data of attribute associated with a route display toward a destination in the map data;
performing the route guidance toward the destination, based on the map data having the updated layer data of attribute associated with a route display toward the destination;
checking whether approaching the destination within a given distance during the route guidance;
if approaching the destination within a given distance, updating layer data of attribute associated with a position display of the destination in the map data; and
performing the route guidance toward the destination, based on the map data having the updated layer data of attribute associated with a position display of the destination.

* * * * *